United States Patent
Laboeck et al.

(10) Patent No.: US 8,393,635 B2
(45) Date of Patent: Mar. 12, 2013

(54) REBOUND STRAP FOR AN AIRBAG COVER AND METHOD FOR PRODUCING A TRIM PART

(75) Inventors: Christian Laboeck, Bad Aibling (DE); Matthias Rech, Schwetzingen (DE)

(73) Assignee: Faurecia Innenraum System GmbH, Hagenbach (DE)

( * ) Notice: Subject to any disclaimer, the term of this patent is extended or adjusted under 35 U.S.C. 154(b) by 119 days.

(21) Appl. No.: 12/743,182

(22) PCT Filed: Nov. 14, 2008
(Under 37 CFR 1.47)

(86) PCT No.: PCT/EP2008/009831
§ 371 (c)(1),
(2), (4) Date: Jan. 27, 2011

(87) PCT Pub. No.: WO2009/062755
PCT Pub. Date: May 22, 2009

(65) Prior Publication Data
US 2011/0278827 A1 Nov. 17, 2011

(30) Foreign Application Priority Data
Nov. 14, 2007 (DE) .................... 10 2007 055 016

(51) Int. Cl.
*B60R 21/216* (2011.01)
(52) U.S. Cl. .................................... 280/728.3
(58) Field of Classification Search ........... 280/728.3
See application file for complete search history.

(56) References Cited

U.S. PATENT DOCUMENTS

| | | | | |
|---|---|---|---|---|
| 6,131,945 A * | 10/2000 | Labrie et al. | | 280/728.3 |
| 6,170,859 B1 | 1/2001 | Kausch | | |
| 7,165,781 B2 * | 1/2007 | Cesar | | 280/728.3 |
| 7,980,587 B2 * | 7/2011 | Chen et al. | | 280/728.3 |
| 8,157,289 B2 * | 4/2012 | Bittner et al. | | 280/728.3 |
| 8,177,255 B2 * | 5/2012 | Le Hoang et al. | | 280/728.3 |
| 2005/0127641 A1 | 6/2005 | Cowelchuk et al. | | |
| 2007/0080521 A1 * | 4/2007 | Leserre et al. | | 280/728.3 |
| 2011/0181028 A1 * | 7/2011 | Brunet | | 280/728.3 |

FOREIGN PATENT DOCUMENTS

| | | |
|---|---|---|
| DE | 19633109 A1 | 2/1997 |
| DE | 19735438 A1 | 2/1999 |
| JP | 07285406 A | 10/1995 |

OTHER PUBLICATIONS

"Air bag door for vehicle instrument panel", Research Disclosure, Mason Publications, Hampshire, GB, Apr. 1, 1995, ISSN: 0374-4353.

International Search Report and Written Opinion issued in PCT/EP2008/009831, dated Feb. 5, 2009, with English Translation, 24 pages.

* cited by examiner

*Primary Examiner* — Drew Brown
(74) *Attorney, Agent, or Firm* — Faegre Baker Daniels LLP

(57) ABSTRACT

A trim part has an airbag cover that opens in a hinged fashion. The trim part includes a retaining element that is connected on a first end to the airbag cover and on a second end to an anchor such that the retaining element has an excess length. At least one of the two ends is connected to a strip that includes webs that extend from the strip and that take up at least part of the excess length.

14 Claims, 3 Drawing Sheets

REBOUND STRAP FOR AN AIRBAG COVER AND METHOD FOR PRODUCING A TRIM PART

CROSS REFERENCE TO RELATED APPLICATIONS

The present application is a national phase application of PCT application PCT/EP2008/009831 filed pursuant to 35 U.S.C. §371, which claims priority to DE 10 2007 055 016.4, filed Nov. 14, 2007. Both applications are incorporated herein by reference in their entirety.

TECHNICAL FIELD

The invention relates to a trim part having a hinged airbag cover that is linked via a flexible flat retaining element, and also to a method for producing such a trim part.

BACKGROUND

A generic trim part may include a retaining element that is secured by a first end on the airbag cover and by a second end on an anchor that is spaced apart from the airbag cover and that has an excess length between the airbag cover and the mentioned anchor, at least one of the two ends being connected to a strip which is orientated transversely relative to a loading direction of the retaining element and is secured on the airbag cover or on the anchor. Such a trim part is known for example from the publication DE 196 33 109 A1.

The strip is intended to provide a stable connection of the airbag cover to the anchor, which connection has sufficient loading capacity to withstand an opening thrust. The excess length of the retaining element is typically produced in that the retaining element in the form of a loop is guided by the anchor to the airbag cover. This is intended to allow the airbag cover, when the airbag is deployed, to be raised from a passage opening of the trim part before the retaining element tightens and then acts as hinge and forces a rotational movement of the opening airbag cover which is only then possible without being impeded. In the production of such trim parts according to the state of the art, the problem arises that the retaining element can jam or become damaged between the strip and the airbag cover or the anchor because of the required excess length when securing the strip connected to the retaining element on the airbag cover or on the anchor spaced apart from the airbag cover so that only a reduced excess length remains unintentionally and possibly without being noticed and subsequently, when an airbag is deployed, an opening movement of the airbag cover is impeded because of the excess length being too small.

SUMMARY

The invention pertains to a corresponding trim part in which jamming or damage to the retaining element during production of the trim part is reliably prevented without causing the production of the trim part to become more complex. Furthermore, the invention pertains to a method which is improved in this respect for producing such a trim part.

An embodiment of the invention pertains to a trim part having a hinged airbag cover. A flexible flat retaining element has a first end secured on the airbag cover and a second end secured on an anchor spaced apart from the airbag cover. The flexible flat retaining element has an excess length between the airbag cover and the anchor. At least one of the two ends is connected to a strip that is oriented transversely relative to a loading direction of the retaining element and is secured on either the airbag cover or the anchor. The strip includes webs that are molded on the strip. The webs are oriented transversely relative to the strip and are attached to the retaining element at least at places. The webs take up at least a part of the excess length of the retaining element.

Another embodiment of the invention pertains to a method for producing a trim part having a hinged airbag cover. A trim part blank is provided, the trim part blank including an airbag cover that covers a passage opening for an airbag. A flexible flat retaining element having at least one of two ends connected to a strip is provided. The retaining element is connected to the trim part blank by securing a first of the two ends on the airbag cover and by securing a second of the two ends on an anchor spaced apart from the airbag cover. The strip is secured on the airbag cover or on the anchor such that an excess length of the retaining element remains between the airbag cover and the anchor. When securing the strip on the airbag cover or on the anchor, jamming is prevented by webs that are molded on the strip and that are oriented transversely to the strip. The webs are connected at least at places to the retaining element and take up at least a part of the excess length of the retaining element.

The webs that are orientated transversely relative to the strip, are connected to the retaining element at least in places and take up at least a part of the excess length of the retaining element, reliably prevent jamming of the retaining element behind the strip when securing the strip on the airbag cover or on the anchor. Damage to the retaining element can thus be avoided because the retaining element, when connecting the retaining element, which is connected to the at least one strip, to the airbag cover and to the anchor, is forced by the webs into a defined position in which the retaining element is not or only slightly slack. The webs are thereby expediently configured to be so weak that they do not impede extension of the retaining element during an opening movement of the airbag cover.

A correspondingly advantageous method for producing a trim part of the type proposed here correspondingly provides that a flexible flat retaining element for the airbag cover, which is connected by at least one of two ends to a strip, is connected to a blank of the trim part with a hinged airbag cover, by securing a first of the two ends on the airbag cover and a second of the two ends on an anchor spaced apart from the airbag cover in that the at least one strip is secured on the airbag cover or on the anchor, an excess length of the retaining element remaining between the airbag cover and the mentioned anchor and jamming of the retaining element being prevented by webs which are molded on the strip and orientated transversely to this strip, which webs are connected to the retaining element at least at places and take up at least a part of the excess length of the retaining element.

The strip can thereby be produced in an advantageously simple manner by injection molding, a connection of the strip to the retaining element then being able to be produced in that the retaining element is injected around during production of the strip and thus is embedded in the strip. In some embodiments, the strip is produced from a thermoplastic plastic material. The webs can be configured in a likewise simple manner in one piece with the strip and injection molded onto the retaining element, for example in such a manner that a material forming the webs surrounds at least some fibers of a material which forms the retaining element and is typically a textile.

In some embodiments, the webs are disposed such that they begin at one edge of the strip at which the retaining element leaves the strip. In order to take up at least a part of the excess length of the retaining element such that the latter is retained in a defined shape by the webs, the webs can follow a curved course, as opposed to a direct connecting line, between the two ends of the retaining element away from the airbag cover.

In some embodiments, the excess length of the retaining element is dimensioned such that the retaining element is tightened during opening of the airbag cover only when the airbag cover has covered a path corresponding approximately or at least to one thickness of the trim part in order that an opening movement is then possible without being impeded. In some embodiments, the webs have a length of approximately the same order of magnitude in order to be able to take up the excess length so far that jamming or damage to the retaining element during assembly is prevented. In some embodiments, the length of the webs is between about 5 mm and 30 mm for this purpose. The webs should thereby not be too thick in order not too greatly to impede extension of the retaining element. In some embodiments, the webs have a diameter of no more than about 5 mm. In some embodiments, the webs have a diameter of no more than about 3 mm.

In some embodiments, in order that the excess length of the retaining element, with not too complex a design of the corresponding strip, can be taken up over the entire width of the retaining element, there may be between two and twelve webs connected at least in places to the retaining element. In some embodiments, there may be at least three or four webs connected to the retaining element at least at places.

During production of the trim part, the at least one strip connected to the retaining element can be connected, in a particularly simple manner, by welding, screwing or riveting to the airbag cover or the anchor such that a connection which has sufficient loading capacity and also withstands deployment of the airbag is produced.

Typically, the retaining element is connected at both ends respectively to a strip orientated transversely relative to the loading direction, i.e. parallel to a corresponding edge of the airbag cover, one of these strips being secured on the airbag cover and the other on the anchor spaced apart from the airbag cover. The anchor can thereby concern, for example, a part of a support of the trim part, a wall or another part of a deployment channel for the airbag or another support part behind the trim part. If the retaining element is secured with two strips assembly of the retaining element can be effected in a particularly advantageous manner after the actual production of the trim part or of a blank of the trim part. Hence the production of the blank is simplified because for example complex introduction of the retaining element into a molding tool for the trim part or into a support of the trim part is unnecessary. In some embodiments, the webs may be molded moulded on the strip which is secured on the airbag cover. In some embodiments, the webs may be molded on the other strip secured on the anchor spaced apart from the airbag cover. If the airbag hinge is intended to be configured in a non-complex manner as far as possible as a moveable part, molding of the webs on the strip secured spaced apart from the airbag cover can be possible. Furthermore, the two strips can be secured in different ways, for example one strip by welding and the other by a screw connection or riveting. In some embodiments, the securement method may be chosen as a function of the material of the airbag cover or of the anchor and as a function of geometric conditions.

BRIEF DESCRIPTION OF THE FIGURES

An embodiment of the invention is explained subsequently with reference to FIGS. 1 to 3.

DETAILED DESCRIPTION

Figure 1:
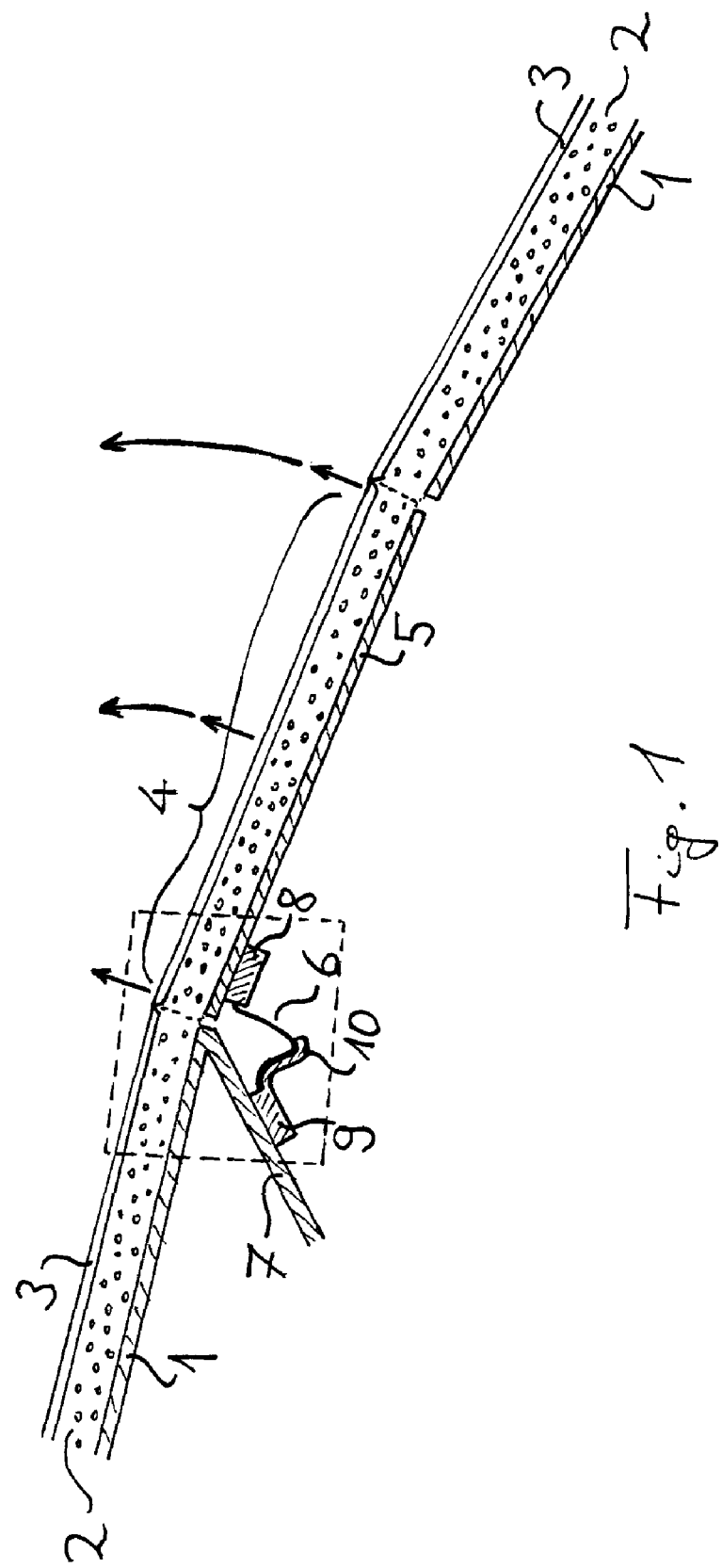
FIG. 1 is a cross-section through a trim part in one embodiment of the invention.

A trim part can be detected in FIG. 1, which concerns a part of an instrument panel behind which a passenger airbag (not illustrated in FIG. 1) is disposed. The trim part has a support 1 made of a thermoplastic plastic material, a foamed intermediate layer 2 and a decorative surface 3. The trim part includes a hinged airbag cover 4 which is disposed above or in front of the mentioned passenger airbag.

The airbag cover 4 has its own support part 5 which fills a passage opening in the support 1. In addition, the intermediate layer 2 and the decorative surface 3 are weakened along an edge of the airbag cover 4 so that the airbag cover 4, when the airbag is deployed, can be released by the opening impact acting then on the support part 5 and thus can release the passage opening.

To prevent the airbag cover 4 from escaping unimpeded into a vehicle interior, the airbag cover 4 is joined via a flexible flat retaining element 6 that is a net-shaped mat manufactured from a textile material, said mat being approximately as wide as the support part 5. For this purpose, the retaining element 6 is secured by a first end on the airbag cover 4 and there on the support part 5 and by a second end on a part of a deployment channel 7 serving as anchor. In some embodiments, instead of a mat, a plurality of bands, disposed in parallel, could serve as the retaining element 6. Between the airbag cover 4 and the anchor on the deployment channel 7, the retaining element 6 has an excess length which allows the airbag cover 4, when an airbag is deployed, to move firstly out of the passage opening so far that an unimpeded hinging movement becomes possible before the retaining element 6 tightens and forces the airbag flap 4 into this hinging movement. The retaining element 6 then acts as airbag flap hinge. In FIG. 1 arrows marked above the airbag 4 illustrate a movement which is performed consequently by the airbag cover 4 when an airbag is deployed.

In some embodiments, in order to secure the retaining element 6, the two ends of the retaining element 6 are connected to two strips 8 and 9 which are orientated transversely relative to a loading direction of the retaining element 6, i.e. perpendicular to a drawing plane of FIG. 1, the strip 8 connected to the first end being secured on the support part 5 of the airbag cover 4 and the strip 9 connected to the second end being secured on the anchor provided by the deployment channel 7.

On the strip 9, webs 10 which are orientated transversely relative to this strip 9 are molded. The webs 10 are connected to the retaining element 6 and take up the excess length of the retaining element 6 such that the retaining element 6 has almost no more slack and is retained by the webs 10 in a defined shape and position.

Figure 2:
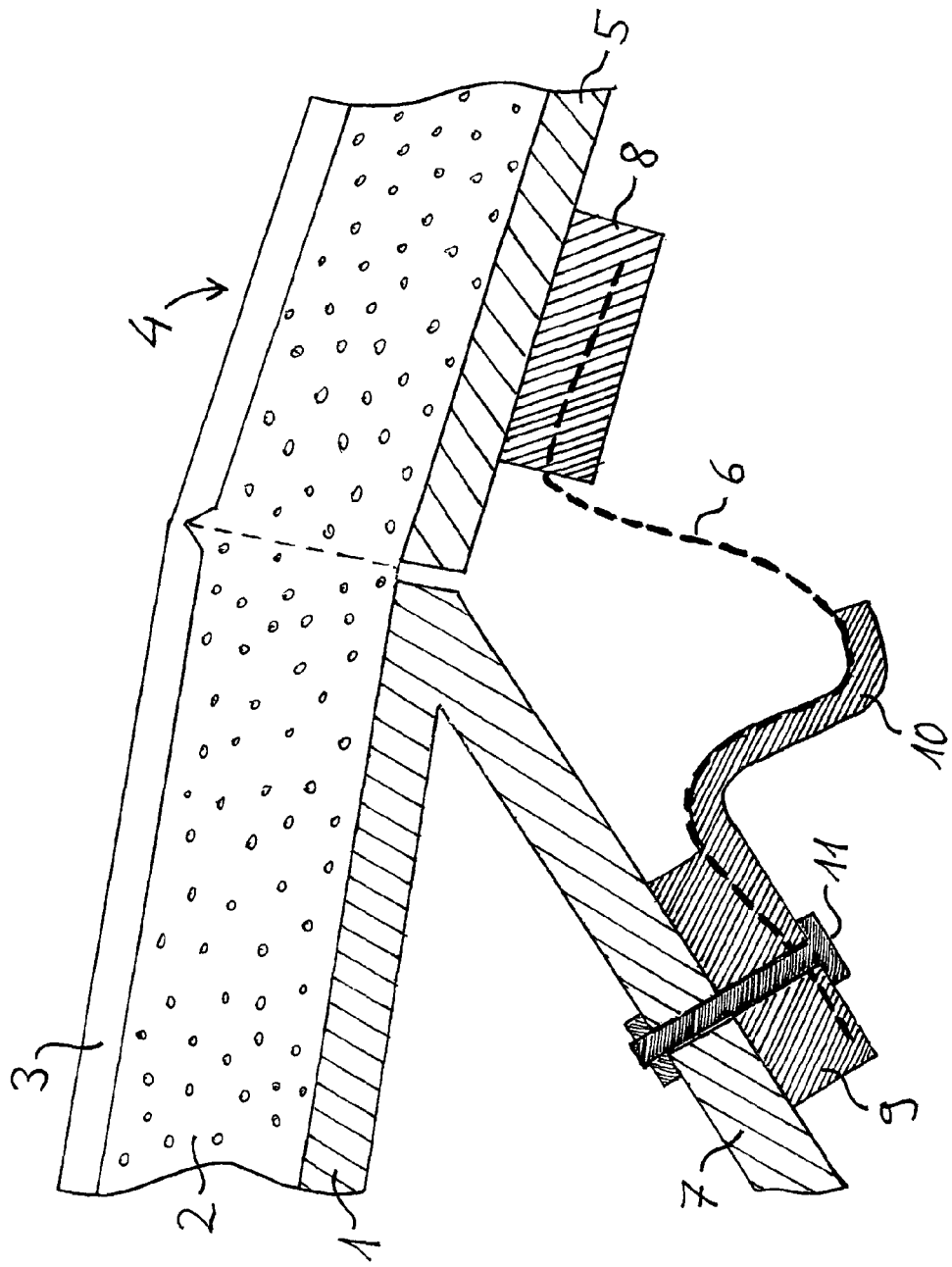
FIG. 2 is an enlarged section of the cross-section of FIG. 1

A partial region encircled in FIG. 1 by a broken line is represented once again in more detail in FIG. 2. The same features are thereby provided again with the same reference numbers. The strips 8 and 9 are injection molded parts which are manufactured from thermoplastic plastic material and in which the respective end of the retaining element 6 is embedded. For this purpose, the retaining element 6 is introduced into a corresponding casting mold so that the two ends of the retaining element 6 were injection molded around during production of the strips 8 and 9. The webs 10, eight of which, in the present embodiment, are disposed distributed over a width of the airbag cover 4 or along the strip 9, are configured in one piece with the strip 9 and, during production of the strip 9, were injection molded in the same molding tool on the retaining element 6 such that at least some fibers of the retaining element 6 are surrounded by a material forming the webs 10. For this purpose, the webs 10 begin at an edge of the strip 9 orientated towards the strip 8, at which the retaining element 6 leaves the strip 9. In order to take up the excess length of the retaining element 6, the webs 10, of which only a first respectively can be detected in FIGS. 1 and 2, follow a curved course, as opposed to a direct connection line, between the two strips 8 and 9 away from the airbag cover 4. The webs 10 thereby have a diameter of about 2.5 mm and a length of about 15 mm.

The strip 9 is connected by screws 11, indicated in FIG. 2, to the part of the deployment channel 7 serving as anchor. Instead of the screws 11, for example rivets could also be used for securing the strip 9. The other strip 8 is welded onto the support part 5 which is likewise manufactured from a thermoplastic plastic material. It can be welded in particular for example by ultrasonic welding or can have been welded by energy direction sensor welding. This allows subsequent securing of the retaining element 6 after production of a blank of the trim part provided by the remaining components of the trim part. This facilitates production of this blank, for which for example the decorative surface 3 is back-foamed and thus can be connected to the support 1 and to the support part 5. If the retaining element 6 which is firstly embedded by its ends in the strips 8 and 9 and connected to the webs 10 is connected to the thus produced blank of the trim part in that the strip 8 is welded to the support part 5 and the strip 9 is screwed to the deployment channel 7 or riveted there, jamming of the retaining element 6, provided with the excess length, between the strip 9 and the deployment channel 7 or between the strip 8 and the support part 5 is prevented in that the excess length is taken up at least for the most part by the webs 10 which retain the retaining element 6 consequently in a defined position. The webs 10 are designed thereby to be weak enough that they do not impede extension of the retaining element 6 when the airbag is deployed. In order to secure the strips 8 and 9, the retaining element 6 formed by a net-shaped textile is placed with the strips 8 and 9 in a welding tool, the retaining element 6 being forced by the webs 10 into the shape of a loop and thus being prevented not only from jamming but also being protected from damage without the retaining element 6 requiring, in a complex manner, to be placed in its position before welding and screwing manually or by robot control. Rather, it suffices to bring the strips 8 and 9 into the desired positions before securing on the support part 5 and on the deployment channel 7.

Figure 3:
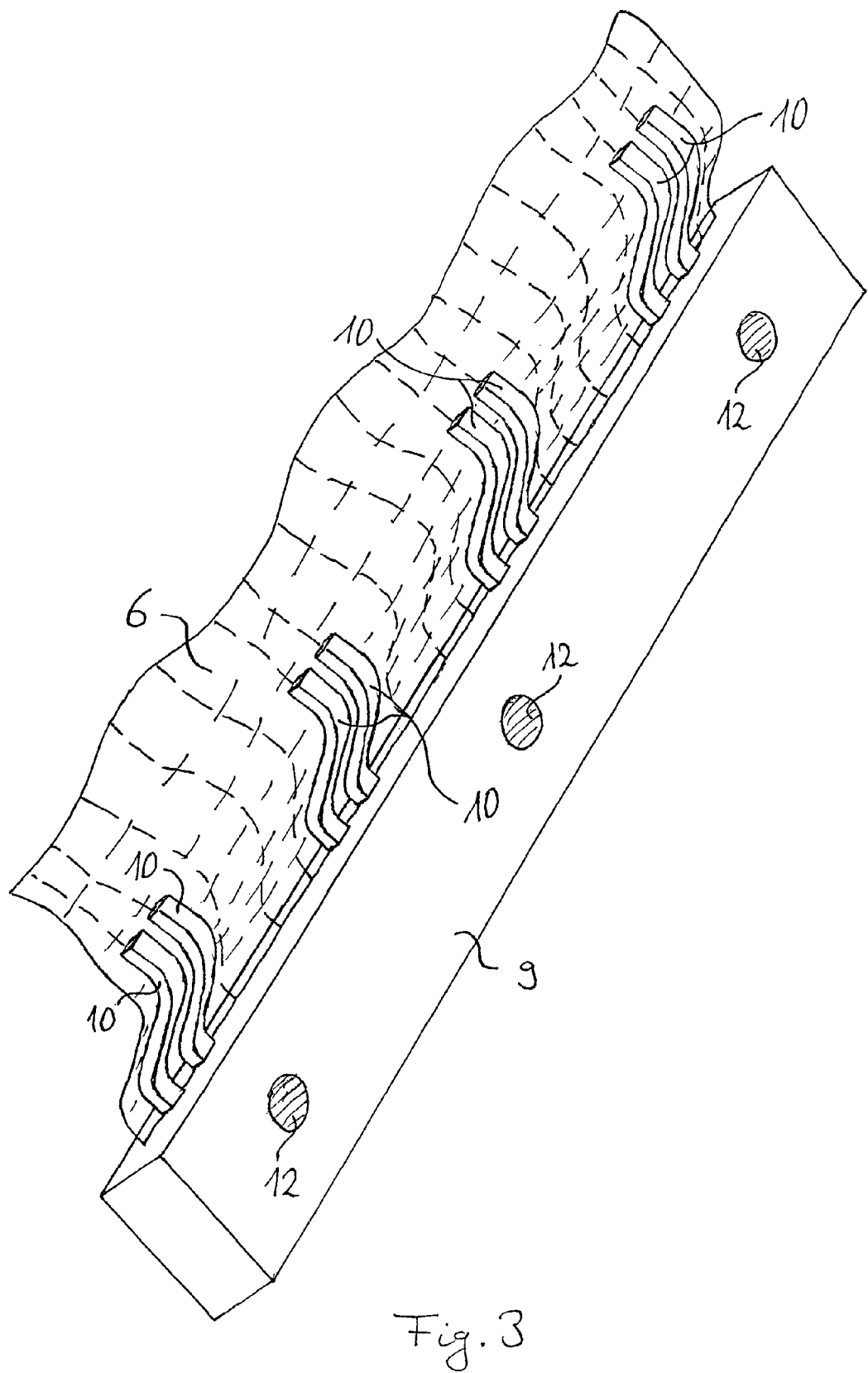
FIG. 3 is a perspective view of components of the trim part of FIGS. 1 and 2.

In FIG. 3, the strip 9 having the webs 10 and a part of the retaining element 6 is shown once again in a perspective view. All eight webs 10 can be detected here. Three borings 12 for receiving the screws 11 which serve to secure the strip 9 can likewise be detected in FIG. 3. Of course, the webs 10 could also be molded on the other strip 8 instead of the strip 9, which strip 8 is secured on the airbag cover 4. The strip 9, which is secured here on the deployment channel 7 designed in one piece with the support 1, could in turn alternatively also be secured on other supporting parts spaced apart from the trim part.

Finally, it may be explained that the term "strip" used herein should be understood in a wide sense. It is used here because the elements described therewith, which are characterized in the embodiments in the Figures with the reference numbers 8 and 9, are in fact strip-shaped in typical embodiments of the invention. However, the term should also include here anchor elements of a different shape which fulfil the same function.

The invention claimed is:

1. A trim part comprising:
   a hinged airbag cover;
   a flexible flat retaining element having a first end and a second end, the first end of the flexible flat retaining element secured to the airbag cover, the flexible flat retaining element having an excess length;
   an anchor, the second end of the flexible flat retaining element secured to the anchor;
   at least one bar that is oriented transversely relative to a loading direction of the retaining element, at least one of the first and second ends of the flexible flat retaining element being connected to the at least one bar, the at least one bar being secured on a rear side of the airbag cover or on the anchor; and
   webs molded on the at least one bar, the webs oriented transversely to the at least one bar and being connected to the flexible flat retaining element, the webs taking up at least a part of the excess length.

2. The trim part of claim 1, wherein the at least one bar and the webs are integrally molded with the flexible flat retaining element being embedded in the bar.

3. The trim part of claim 2, wherein the webs are integrally molded with the flexible flat retaining element.

4. The trim part of claim 2, wherein parts of the flexible flat retaining element are integrally molded around the webs.

5. The trim part of claim 1, wherein the webs begin at an edge of the bar at which the flexible flat retaining element leaves the bar.

6. The trim part of claim 1, wherein the webs follow a curved course away from the flexible flat retaining element between the first and second ends of the flexible flat retaining element.

7. The trim part of claim 1, wherein the webs have a length that is between about 5 millimeters and about 30 millimeters.

8. The trim part of claim 1, comprising a total of about 2 to about 12 webs.

9. The trim part of claim 1, wherein the flexible flat retaining element comprises a band or mat made of a textile material.

10. The trim part of claim 1, wherein the at least one bar strip is welded, screwed or riveted to either the airbag cover or the anchor.

11. A method for producing a trim part having a hinged airbag cover by connecting a trim part blank and a flexible flat retaining element, the trim part blank including a hinged airbag cover for covering a passage opening for an airbag, the flexible flat retaining element having two ends, at least one of the two ends being connected to a bar, the flexible flat retaining element having an excess length, the method comprising:
   securing a first of the two ends of the flexible flat retaining element on the airbag cover; and
   securing a second of the two ends of the flexible flat retaining element on an anchor such that the bar is secured on a rear side of the airbag cover or on the anchor, an excess length of the retaining element remaining between the airbag cover and the anchor;
   wherein when securing the bar on the airbag cover or on the anchor, jamming of the retaining element is prevented by webs that are molded on the bar and that are orientated transversely relative to the bar, the webs being connected to the retaining element and taking up at least a part of the excess length of the retaining element.

12. The method of claim 11, wherein the bar is injection molded such that the flexible flat retaining element is embedded in the bar.

13. The method of claim 11, wherein the webs are configured in one piece with the bar and are injection molded onto the flexible flat retaining element.

14. The method of claim 11, wherein the bar is welded, screwed or riveted to either the airbag cover or the anchor.

* * * * *